US011518045B1

(12) United States Patent
Alqasemi et al.

(10) Patent No.: US 11,518,045 B1
(45) Date of Patent: Dec. 6, 2022

(54) ROBOTIC END EFFECTORS FOR USE WITH ROBOTIC MANIPULATORS

(71) Applicant: UNIVERSITY OF SOUTH FLORIDA, Tampa, FL (US)

(72) Inventors: Redwan Alqasemi, Wesley Chapel, FL (US); Paul Mitzlaff, Palm Harbor, FL (US); Andoni Aguirrezabal, Tampa, FL (US); Lei Wu, Tampa, FL (US); Karl Rothe, Rockledge, FL (US); Rajiv Dubey, Tampa, FL (US)

(73) Assignee: University of South Florida, Tampa, FL (US)

( * ) Notice: Subject to any disclaimer, the term of this patent is extended or adjusted under 35 U.S.C. 154(b) by 98 days.

(21) Appl. No.: 16/676,580

(22) Filed: Nov. 7, 2019

Related U.S. Application Data (63) Continuation of application No. 16/149,652, filed on Oct. 2, 2018, now Pat. No. 10,493,634, which is a continuation of application No. 15/626,279, filed on Jun. 19, 2017, now Pat. No. 10,265,862.

(60) Provisional application No. 62/352,791, filed on Jun. 21, 2016.

(51) Int. Cl.
*B25J 15/00* (2006.01)
*B25J 15/02* (2006.01)

(52) U.S. Cl.
CPC ......... *B25J 15/0038* (2013.01); *B25J 15/022* (2013.01)

(58) Field of Classification Search
CPC .. B25J 15/0038; B25J 15/022; B25J 15/0028; B25J 15/0266; B25J 15/0033
See application file for complete search history.

(56) References Cited

U.S. PATENT DOCUMENTS

| 4,579,380 A | 4/1986 | Zaremsky |
| 5,108,140 A | 4/1992 | Bartholet |
| 5,570,920 A * | 11/1996 | Crisman ............ B25J 9/104 |
| | | 294/111 |
| 7,445,260 B2 | 11/2008 | Nihei |

(Continued)

FOREIGN PATENT DOCUMENTS

JP   5591535 B2 *  9/2014  ............. B25J 9/104

OTHER PUBLICATIONS

Eric Brown et al. "Universal robotic gripper based on the jamming of granular material". Proceedings of the National Academy of Sciences of the United States of America vol. 107 No. 44 (2010): 18809-18814.

(Continued)

*Primary Examiner* — Stephen A Vu
(74) *Attorney, Agent, or Firm* — Quarles & Brady LLP (57) ABSTRACT

In one embodiment, a robotic end effector configured to mount to a robotic manipulator includes gripping elements configured to grasp objects, a drive mechanism configured to open and close the gripping elements, a central controller configured to control operation of the drive mechanism and the gripper elements, the central controller hosting a control program that enables control of the end effector independent of the robotic manipulator, and at least one of a forward-facing ultrasonic distance sensor configured to measure a distance between the gripping elements and an object to be grasped, and a forward-facing camera mounted between the gripping elements configured to capture video data of an object to be grasped.

16 Claims, 6 Drawing Sheets

(56) References Cited

U.S. PATENT DOCUMENTS

| | | | |
|---|---|---|---|
| 8,191,947 B2 * | 6/2012 | Jouan De Kervanoael | ............... B25J 15/0253 294/106 |
| 8,757,690 B2 * | 6/2014 | Gao | ............... B25J 15/08 294/198 |
| 8,973,958 B2 | 3/2015 | Demers | |
| 9,156,170 B2 * | 10/2015 | Shiomi | ............... B25J 15/0028 |
| 9,272,422 B2 | 3/2016 | Matsuoka | |
| 9,630,315 B2 | 4/2017 | Cookson | |
| 9,782,902 B1 * | 10/2017 | Kim | ............... B25J 15/0009 |
| 2011/0148132 A1 * | 6/2011 | Park | ............... B25J 15/10 294/106 |
| 2013/0154294 A1 * | 6/2013 | Shiomi | ............... B25J 15/12 294/213 |
| 2014/0180477 A1 | 6/2014 | Chung | |

OTHER PUBLICATIONS

Robotiq. "Adaptive Robot Gripper 2-Finger (85 & 140) Instruction Manual". (2012).

Robotiq. "Robotiq 3-Finger Adaptive Robot Gripper Instruction Manual". (2014).

Shadow Robot Company. "Shadow Dexterous Hand Technical Specifications". (2013).

Custom Entertainment Solutions Inc. "Mecha TE Limited Edition Animatronic Hand Instructions", 2013.

\* cited by examiner

ROBOTIC END EFFECTORS FOR USE WITH ROBOTIC MANIPULATORS

CROSS-REFERENCE TO RELATED APPLICATION

This application is a continuation application of co-pending U.S. Non-Provisional Application entitled "Robotic End Effectors for Use With Robotic Manipulators", having Ser. No. 16/149,652 and filed Oct. 2, 2018, and claims priority to U.S. Non-Provisional Application entitled "Robotic End Effectors for Use With Robotic Manipulators", having Ser. No. 15/626,279 and filed Jun. 19, 2017, now U.S. Pat. No. 10,265,862, which claims priority to U.S. Provisional Application Ser. No. 62/352,791, filed Jun. 21, 2016, all of which are hereby incorporated by reference herein in their entireties.

NOTICE OF GOVERNMENT-SPONSORED RESEARCH

This invention was made with Government support under Grant Number IIP0135763 awarded by The National Science Foundation. The Government has certain rights in the invention.

BACKGROUND

Robotic end effectors, such as robotic grippers, are often provided at the distal ends of robotic manipulators, such as robotic arms, to enable grasping and manipulating of objects. While there are several useful robotic grippers in the market, they often have one or more drawbacks that interfere with their usability. For example, many such grippers have only two fingers and are capable of manipulating only some objects. Others have multiple fingers, but are complicated and, therefore, difficult to control. Lower cost grippers often do not comprise features that assist in their operation, such as cameras and proximity sensors. While other grippers comprise such features, they tend to be prohibitively expensive and, therefore, out of reach for many. Irrespective of cost, many grippers either only can be used with particular robotic arms or must be integrated with the robotic arm to which it is attached. Such integration typically requires a skilled programmer to write computer code that enables the robotic arm to communicate with and control the gripper.

In view of the above discussion, it can be appreciated that it would be desirable to have an end effector, such as a robotic gripper, that avoids one or more of the aforementioned drawbacks.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have an end effector that avoids one or more of the drawbacks of commercially available end effectors. Disclosed herein are self-contained robotic end effectors that can be used with a variety of robotic manipulators and operated independently of the manipulators using a built-in software platform of the end effector. The end effector is designed to manipulate various object shapes and is customizable for multiple applications. Moreover, the end effector can be manufactured and sold at a fraction of the cost of current commercially available units. In some embodiments, the end effector is specifically designed for use in activities of daily living (ADLs).

In the following disclosure, various specific embodiments are described. It is to be understood that those embodiments are example implementations of the disclosed inventions and that alternative embodiments are possible. All such embodiments are intended to fall within the scope of this disclosure.

Disclosed herein are self-contained robotic end effectors that can be integrated into various robotic systems. These end effectors can be used to accomplish a wide array of object manipulation tasks made easy by their design. The end effectors comprise a wide array of features that can be used to help accomplish these tasks.

Figure 1:
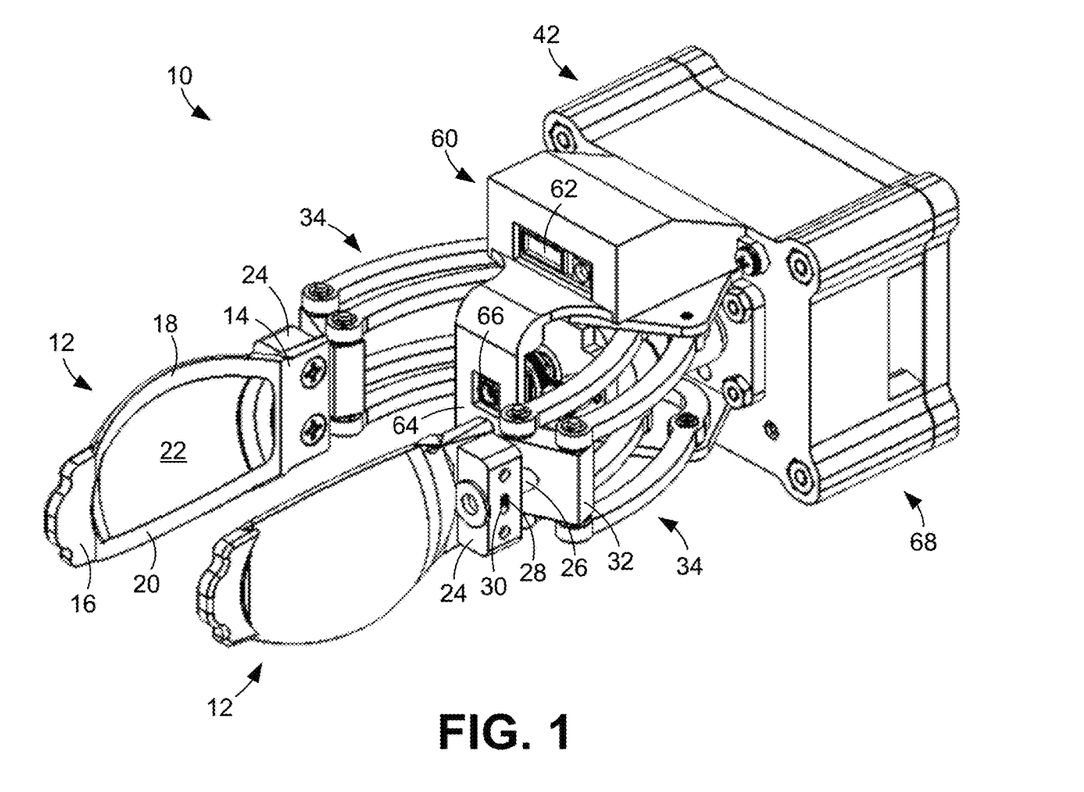
FIG. 1 is a perspective view of an embodiment of a robotic end effector.
Figure 2:
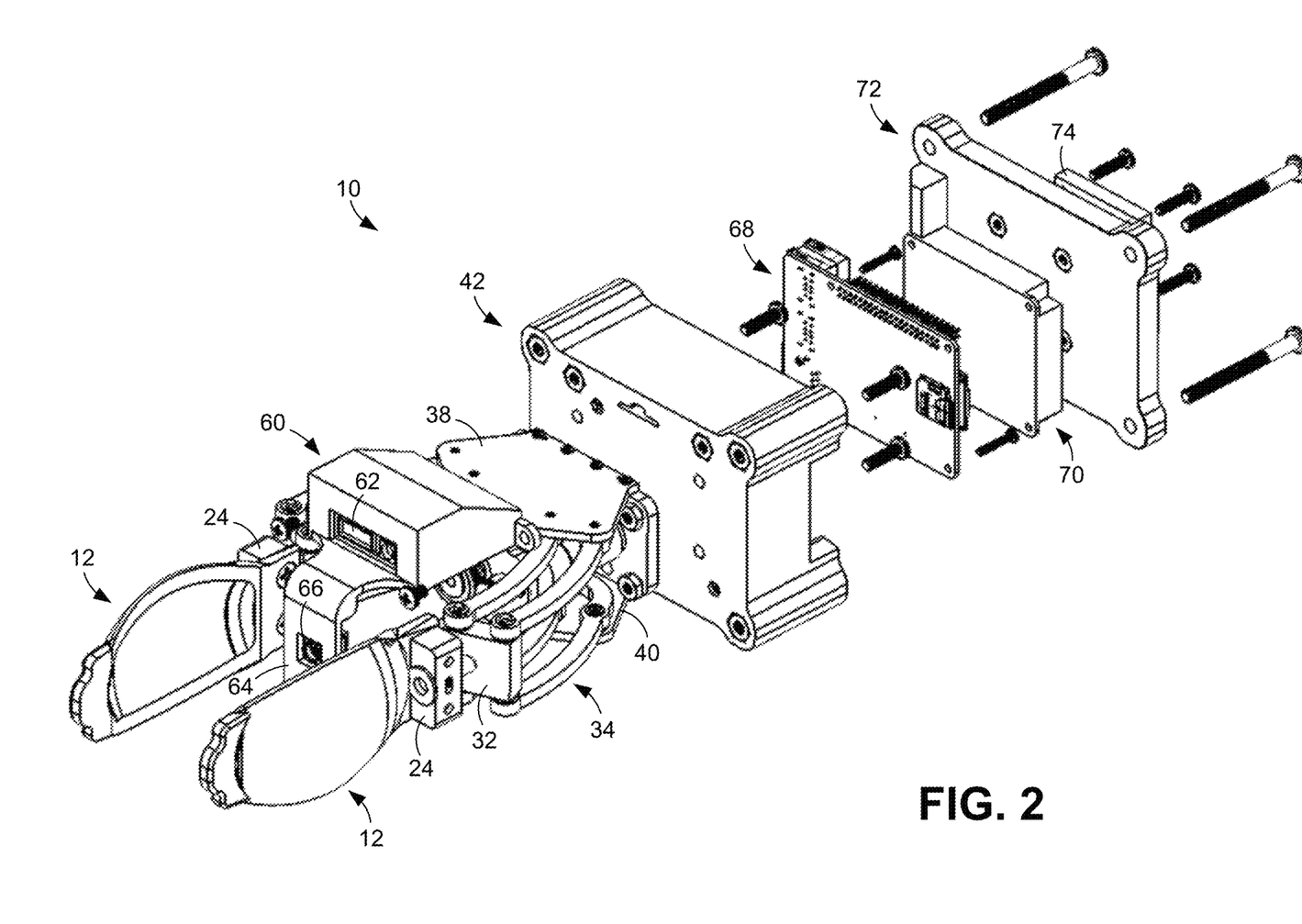
FIG. 2 is an exploded perspective view of the robotic end effector of FIG. 1.

FIGS. 1 and 2 illustrate an example embodiment of self-contained robotic end effector 10. As is apparent from FIG. 1, the end effector 10 is configured as a robotic gripper. For purposes of convenience, the end effector 10 will be referred to herein as a robotic gripper.

The robotic gripper 10 includes two opposed gripping elements 12 that are designed to grasp objects. As identified in FIG. 1 and FIG. 3A, each gripping element 12 has an elongated paddle-like body that comprises a proximal planar edge surface 14, a distal planar edge surface 16 that is parallel to the proximal planar edge surface, upper and lower curved medial edge surfaces 18 and 20 that are parallel to each other, and a concave central surface 22 that is positioned between the other surfaces. The planar edge surfaces 14, 16 enable the gripper 10 to grasp flat objects, such as pieces of paper and books. The curved medial edge surfaces 18, 20 enable the gripper 10 to grasp cylindrical objects, such as glasses and cans. The concave central surfaces 22 enable the gripper 10 to grasp round objects, such as balls. Accordingly, the gripping elements 12 are specifically designed to enable the user to grasp and manipulate many different types of objects.

Figure 3A:
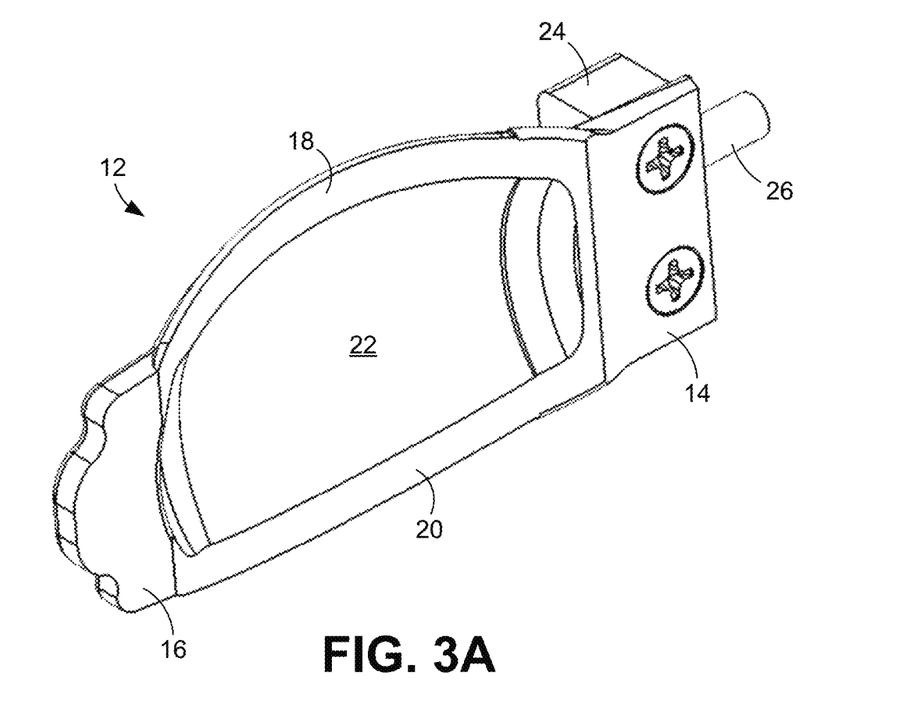
FIGS. 3A and 3B are inner and outer perspective views, respectively, of an embodiment of a gripping element that can be used in the robotic end effector of FIG. 1.
Figure 3B:
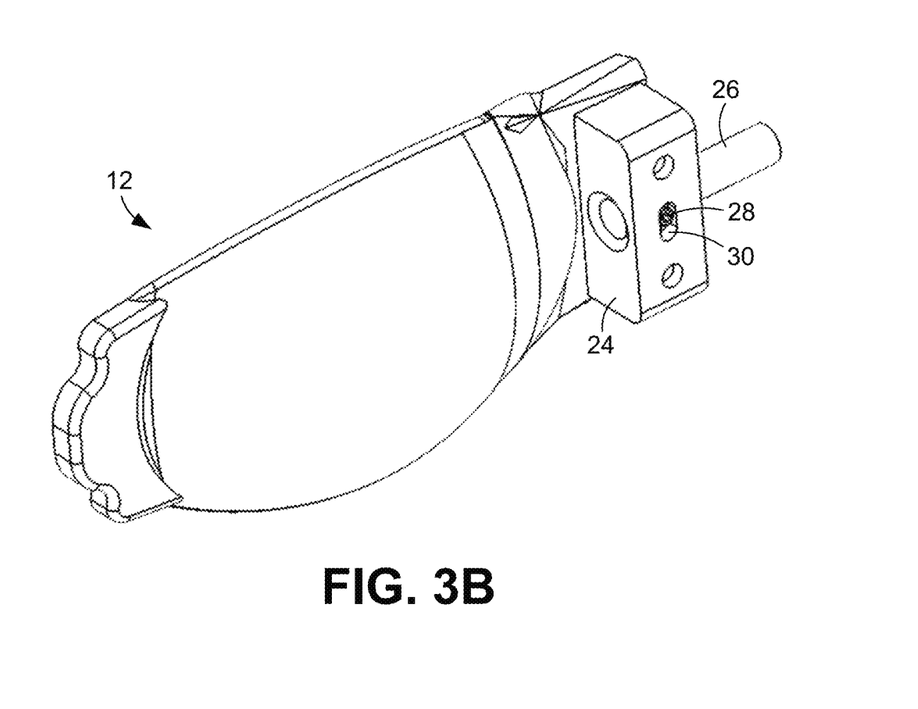

As shown most clearly in FIGS. 3A and 3B, each gripping element 12 is fixedly mounted to a mounting block 24 that enables the gripping element to rotate about a longitudinal axis defined by a shaft 26 that extends from the gripper 10. The range of this rotation is limited by a pin 28 that is fixed to and extends radially outward from the shaft 26. The pin 28 is positioned within a slot 30 provided within the mounting block 24. The gripping element 12 can rotate through an angular range defined by the ends of the slot 30, which limit movement of the pin 30.

Figure 4:
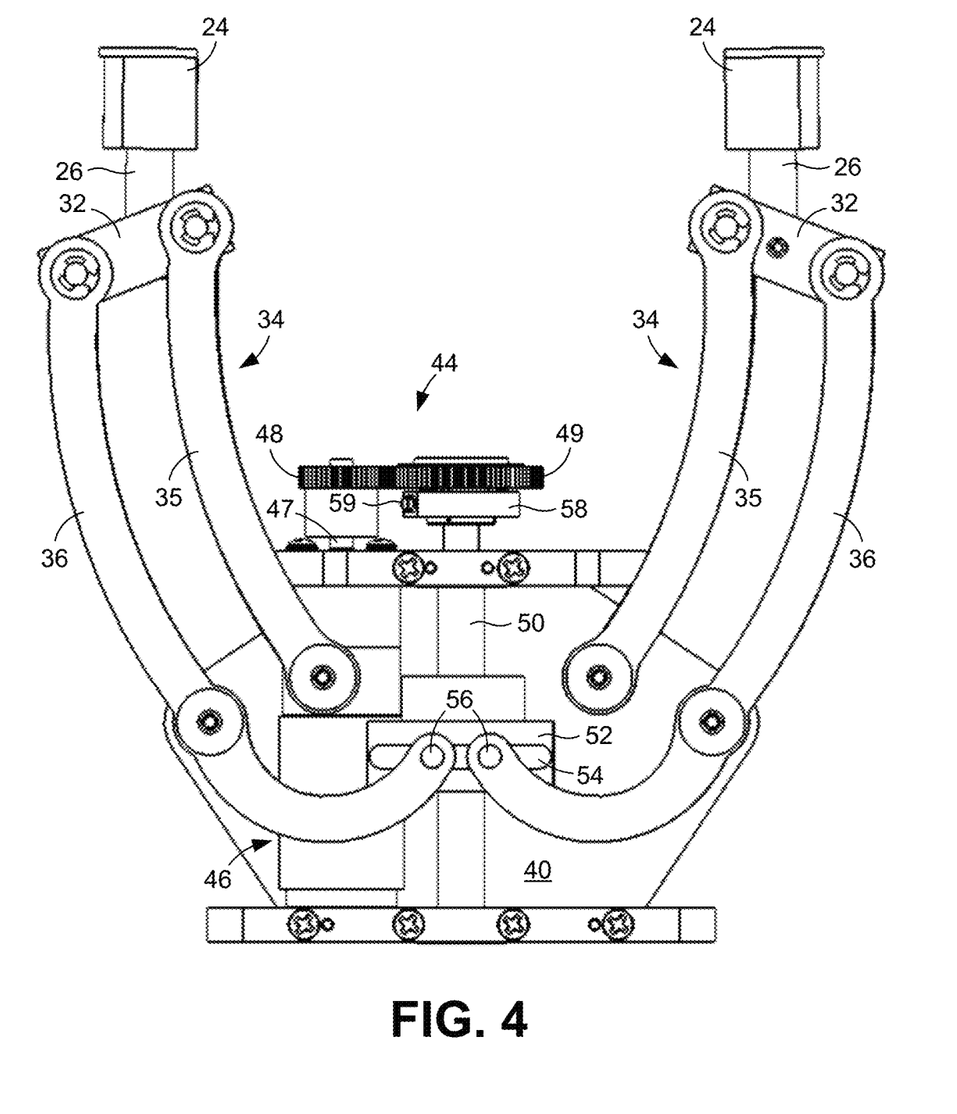
FIG. 4 is a top view of an embodiment of a gripping mechanism that can be used in the robotic end effector of FIG. 1.

With reference to FIGS. 1, 2, and 4, each shaft 26 is mounted to and extends from a linking member 32 that links multiple arms 34 of the robotic gripper 10. In particular, the distal ends of the arms 34 associated with each gripping element 12 are each pivotally connected to the linking member 32. In the illustrated embodiment, four such arms 34 are connected to each linking member 32. The arms 34 form two substantially identical four-bar mechanisms on each side of the robot gripper 10 (two four-bar mechanisms for each gripping element 12) that maintain their associated gripping element 12, and its planar edge surfaces 14, 16, generally parallel to the other griping element 12 and its planar edge surfaces 14, 16 irrespective of the positions of the arms and the distance between the gripping elements. In the illustrated embodiment, the arms 34 associated with each linking member 32 include upper and lower inner arms 35, which are substantially identical, and upper and lower outer arms 36, which are also substantially identical (see FIG. 4). As illustrated in FIG. 4, the inner arms 35 can each pivot about a pivot point located at its proximal end, while the outer arms 36 can each pivot about a pivot point located at an intermediate position along its length. As is also shown in FIG. 4, each of the arms 34 can be curved.

As shown most clearly in FIG. 2, the arms 34 are pivotally mounted between top and bottom mounting plates 38 and 40 that, in turn, are fixedly mounted to an electronics housing 42 of the robotic gripper 10. Also mounted between these plates 38, 40 is a drive mechanism 44, which is visible in FIG. 4. As shown in this figure, the drive mechanism 44 includes a drive motor 46 that rotates a shaft 47 as well as a first gear 48 mounted to the shaft. The first gear 48 is engaged with a second gear 49 that is mounted to a threaded shaft 50. A pull nut 52 is threaded onto the threaded shaft 50 and includes an elongated slot 54 in which pins 56 mounted to the proximal ends of the outer arms 36 are received. When the threaded shaft 50 rotates, the pull nut 52 is linearly displaced along the shaft, which causes the pins 56 of the outer arms 36 to travel along the slot 54 which, in turn, causes the outer arms 36 to pivot about their intermediate pivot points. Because the outer arms 36 are coupled to the inner arms 35 with the linking members 32, pivoting of the outer arms causes pivoting of the inner arms. This pivoting of the inner and outer arms 35, 36 causes opening and closing of the gripping elements 12. The angular orientations of the linking members 32 change as the inner and outer arms 35, 36 are pivoted so that the angular orientations of the gripping elements 12 do not change as they are moved toward or away from each other.

With further reference to FIG. 4, the second gear 49 can be mounted to the threaded shaft 50 with a slip clutch 58 that slips when the torque of the motor 46 exceeds a predetermined level so as to avoid damaging a grasped object and/or avoid overheating the motor. The slip point of the slip clutch 58 can be adjusted by the user with a set screw 59 provided on the slip clutch.

With reference back to FIGS. 1 and 2, mounted to the top mounting plate 38 is a sensor mount 60 in which a forward-facing distance sensor 62 is provided. The distance sensor 62 can be used to determine the distance between an object and the gripping elements 12. In some embodiments, the distance sensor 62 is an ultrasonic distance sensor.

Extending forward and downward from the sensor mount 60 is a vertical member 64 to which is mounted a forward-facing camera 66. The camera 66 can be used to capture image and video data that can assist in positioning the gripping elements 12 relative to an object. As shown in FIG. 1, the camera 66 can be positioned between and proximal of the arms 34.

With reference to FIG. 2, the electronics housing 42 contains a main processing unit 68 and a printed circuit board (PCB) 70. The main processing unit 68 can comprise a programmable microprocessor that controls the overall operation of the robotic gripper 10 and communication components that enable communications with the gripper via Ethernet, WIFI, Bluetooth, universal serial bus (USB), and the like. The PCB 70 comprises the logic needed to operate and communicate with individual components of the gripper 10, such as the motor 46, the distance sensor 62, and the camera 66. Together, the main processing unit 68 and the PCB 70 function as a self-contained central controller of the gripper 10. The PCB 70 can further include a current sensor (not shown) that monitors the current of the motor 46 and, therefore, enables a user to program a maximum force that the gripping elements 12 can apply to an object. Unlike the slip clutch 58, this maximum can be changed on the fly using a user interface.

With further reference to FIG. 2, the main processing unit 68 and the PCB 70 are enclosed within the electronics housing 42 using a cover 72, which can be secured in place using threaded fasteners. Attached to the outer surface of the cover 72 is a mounting element 74, such as a harmonic drive plate, that facilitates mounting of the robotic gripper 10 to a robotic manipulator, such as a robotic arm.

Figure 5:
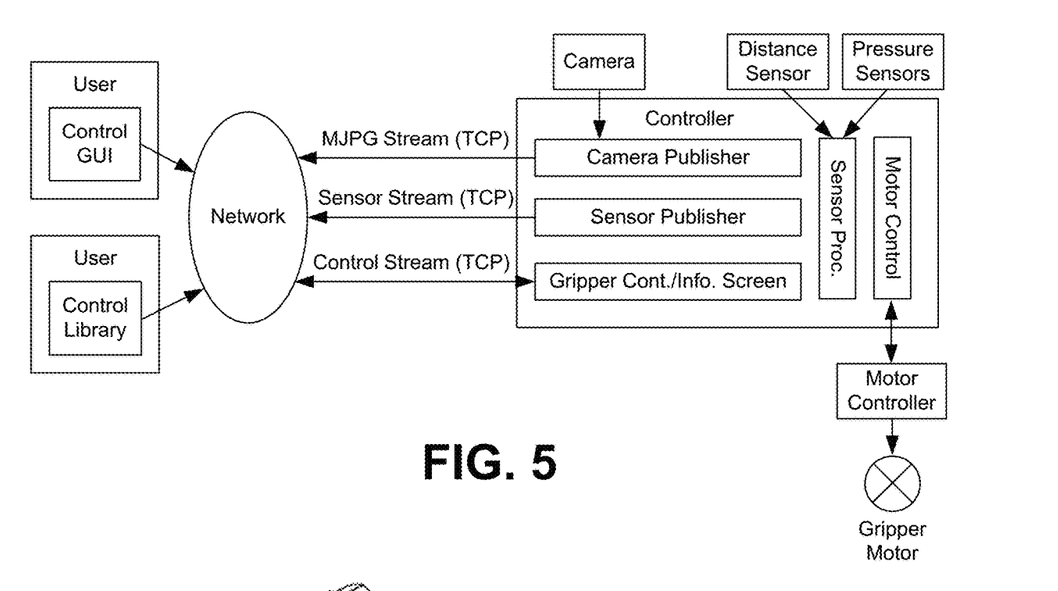
FIG. 5 is a block diagram that illustrates an example of an electronic architecture and operation of a robotic end effector.

FIG. 5 is a block diagram that illustrates the electronic architecture and operation of the robotic gripper 10. A user operates a control graphical user interface (GUI) of a gripper control program resident in the central controller that enables easy operation of the gripper 10 from a computing device. In some embodiments, the gripper control program enables the user to control the positions of the gripper elements 12 and the speed at which they move using simple slider bars. Additionally, the control program enables the user to see all of the sensor information acquired by the gripper, including information from the distance sensor 62, force sensors (see FIG. 8), and camera 66. The control program can also enable the user to set force cutoff limits. These cutoff limits prevent the gripper 10 from closing or opening when a predetermined pressure threshold has been reached. This feature prevents the gripper 10 from exerting too much or too little force on an object. In some embodiments, the control program is available for Windows, Mac OS X, and Linux.

Figure 6:
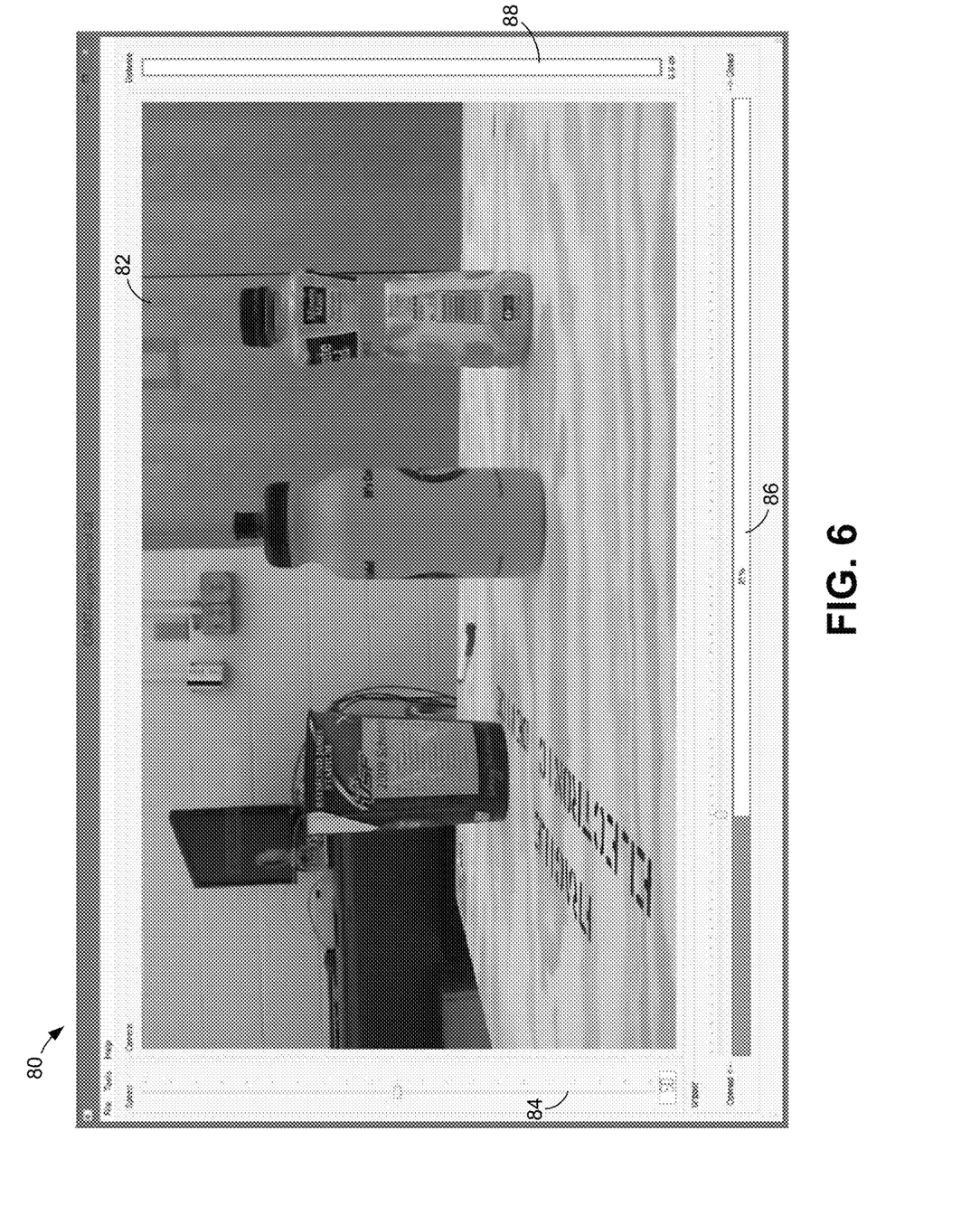
FIG. 6 is an image of an embodiment of a graphical user interface that can be used in conjunction with a robotic end effector.

FIG. 6 illustrates an example GUI 80 hosted by the gripper control program that can be used to control operation of the robotic gripper 10. As indicated in this figure, image and video data captured by the camera 66 can be displayed to the user in a display window 82 of the GUI 80. In this illustrated embodiment, the user can set the speed of actuation of the gripper 10 using a first slide bar 84 provided to the left of the display window 82. The user can set the position of the gripper's gripping elements 12 using a second slider bar 86 provided below the display window 82. The distance of the gripper 10 from an object measured using the distance sensor 66 can be displayed to the user in an indicator bar 88 positioned to the right of the display window 82.

In some embodiments, the user can access commands from a control library and these commands can be communicated to the central controller via a network. The library can be written in a common computer language, such as C++, that enables users to control the gripper 10, acquire sensor information, and view the camera video data, without any additional programming. This library can be cross-platform and can be used on any suitable computing device, including smart phones and tablets. The commands are part of the control stream identified in the figure. Returning from the central controller are the video data stream and feedback from the sensors of the gripper. The central controller receives the video data from the camera 66, distance information from the distance sensor 62, and force information from the force sensors. The central controller operates a motor controller that controls activation of the motor 46 in accordance with commands received from the user. Notably, the gripper 10 can be programmed to operate automatically in a desired manner when certain conditions are met.

Figure 7:
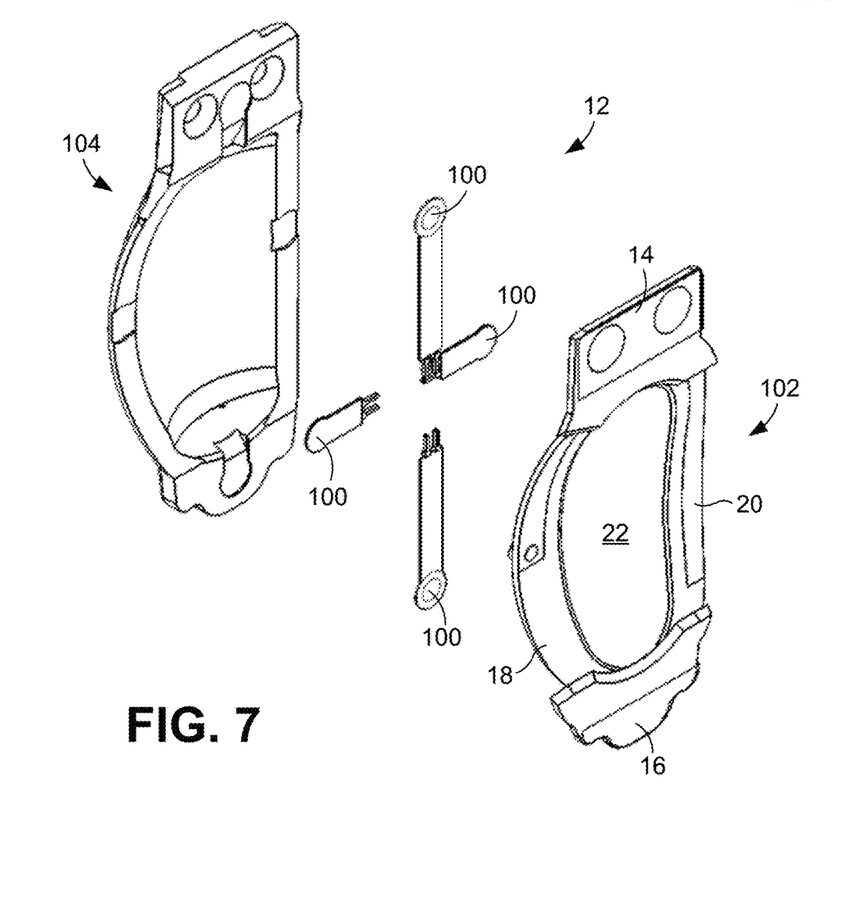
FIG. 7 is an exploded perspective view of an embodiment of a gripping element showing internal force sensors that can be incorporated into the gripping element.

FIG. 7 shows example force sensors 100 that can be integrated into the gripping elements 12. In some embodiments, the sensors 100 can be sandwiched between inner and outer layers 102 and 104 of each individual gripping element 12. In the illustrated embodiment, the gripping element 12 includes four sensors 100: one sensor located at each of the proximal planar edge surface 14, the distal planar edge surface 16, the upper curved medial edge surface 18, and the lower curved medial edge surface 20. A combined reading from all four sensors 100 provides information about the pressure position on the gripping element 12.

A robotic gripper having a configuration similar to that described above was used with a wheelchair-mounted robotic arm (WMRA) as the system's primary gripper for testing purposes. Using this gripper, the WMRA successfully manipulated objects of different classifications including bottles, cups, and markers. With the addition of the current feedback and shutoff, the gripper exhibited the ability to grasp objects that could have been crushed by the gripper.

As can be appreciated from the above discussion, the disclosed robotic grippers are effective, fully featured, and cost-effective devices that can be used in a wide array of robotic manipulation tasks. Additionally, the grippers can be added to existing robotic systems with little, if any, modification to the existing system or the gripper.

The invention claimed is:

1. A robotic end effector configured to mount to a robotic manipulator, the end effector comprising:
    gripping elements configured to grasp objects;
    a drive mechanism configured to open and close the gripping elements;
    a central controller disposed within the end effector, the central controller configured to control operation of the drive mechanism and
    the gripper elements, the central controller hosting a control program that enables control of the end effector independent of the robotic manipulator; and
    a forward-facing ultrasonic distance sensor configured to measure a distance between the gripping elements and an object to be grasped.

2. The end effector of claim 1, wherein there are two opposed gripping elements that are configured to be moved toward and away from each other using the drive mechanism without changing angular orientations of the two opposed gripping elements.

3. The end effector of claim 2, further comprising arms that connect the gripping elements to the drive mechanism.

4. The end effector of claim 3, wherein the arms form four-bar mechanisms that maintain each of the gripping elements parallel to another gripping element during opening and closing of the end effector.

5. The end effector of claim 4, further comprising mounting blocks to which the gripping elements are fixedly mounted, shafts to which the mounting blocks are pivotally mounted, and linking members from which the shafts extend, wherein a distal end of each of the arms are pivotally mounted to the linking members.

6. The end effector of claim 5, wherein the mounting blocks, and therefore the gripping elements, can rotate about the shafts to enable the gripping elements to conform to a shape of an object to be grasped.

7. The end effector of claim 1, wherein there are two opposed gripping elements and each has a paddle-shaped body.

8. The end effector of claim 7, wherein each of the gripping elements comprises planar edge surfaces adapted to interface with flat objects, curved edge surfaces adapted to interface with cylindrical objects, and a concave central surface adapted to interface with round objects.

9. The end effector of claim 1, wherein the drive mechanism comprises a motor and a slip clutch that slips when a predetermined torque is reached by the motor so as to limit a force that can be transmitted by the gripping elements to an object.

10. The end effector of claim 1, wherein the control program supports a graphical user interface that enables a user to control the gripping elements.

11. The end effector of claim 1, further comprising a forward-facing camera mounted between the gripping elements configured to capture video data of an object to be grasped.

12. The end effector of claim 1, further comprising a current sensor configured to limit a maximum force with which the gripping elements can close on an object.

13. The end effector of claim 1, wherein the gripping elements comprise force sensors adapted to measure forces with which the gripping elements grip an object.

14. A robotic end effector configured to mount to a robotic manipulator, the end effector comprising:
    gripping elements configured to grasp objects;
    a drive mechanism configured to open and close the gripping elements;
    a central controller disposed within the end effector, the central controller configured to control operation of the drive mechanism and
    the gripper elements, the central controller hosting a control program that enables control of the end effector independent of the robotic manipulator; and
    a forward-facing camera mounted between the gripping elements configured to capture video data of an object to be grasped.

15. The end effector of claim 14, wherein there are two opposed gripping elements configured to be moved toward and away from each other and further comprising arms that connect the gripping elements to the drive mechanism, each of the arms comprising a four-bar mechanism that maintains each of the gripping elements parallel to another gripping element without changing an angular orientation of the respective gripping element during opening and closing of the end effector.

16. A robotic end effector configured to mount to a robotic manipulator, the end effector comprising:
    gripping elements configured to grasp objects;
    a drive mechanism configured to open and close the gripping elements;
    a central controller configured to control operation of the drive mechanism and the gripper elements, the central controller hosting a control program that enables control of the end effector independent of the robotic manipulator; and a forward-facing ultrasonic distance sensor configured to measure a distance between the gripping elements and an object to be grasped, wherein the drive mechanism comprises a motor and a slip clutch that slips when a predetermined torque is reached by the motor so as to limit a force that can be transmitted by the gripping elements to an object.

* * * * *